United States Patent [19]

Nicholson et al.

[11] 4,432,612
[45] Feb. 21, 1984

[54] PHTHALOCYANINE ELECTROCHROMIC DISPLAY WITH IMPROVED CYCLE LIFE

[75] Inventors: Margie M. Nicholson, San Marino; Frank A. Pizzarello, Yorba Linda, both of Calif.

[73] Assignee: Rockwell International Corporation, El Segundo, Calif.

[21] Appl. No.: 302,876

[22] Filed: Sep. 16, 1981

[51] Int. Cl.³ ............................................. G02F 1/17
[52] U.S. Cl. ................................ 350/357; 252/408.1; 252/600
[58] Field of Search ........................... 252/600, 408.1; 350/357

[56] References Cited

U.S. PATENT DOCUMENTS

| | | | |
|---|---|---|---|
| 3,704,057 | 11/1972 | Beegle | 350/357 |
| 4,117,659 | 10/1978 | Takeshita | 350/357 |
| 4,184,751 | 1/1980 | Nicholson | 350/357 |
| 4,306,774 | 12/1981 | Nicholson | 350/357 |
| 4,371,236 | 2/1983 | Nicholson | 350/357 |

FOREIGN PATENT DOCUMENTS

| | | | |
|---|---|---|---|
| 54587 | 6/1982 | European Pat. Off. | 350/357 |
| 2066496 | 7/1981 | United Kingdom | 350/357 |

OTHER PUBLICATIONS

Kasuga, K. et al., JACS, vol. 102, pp. 4835–4836 (1980).
C.A., vol. 96, 208290j (1982).
C.A., vol. 94, 38588b (1981).

*Primary Examiner*—Teddy S. Gron
*Attorney, Agent, or Firm*—H. F. Hamann; Daniel R. McGlynn

[57] ABSTRACT

An electrochromic display cell including a pair of enclosure plates, at least one of which is transparent, and a counter electrode and a display electrode disposed between the enclosure plates. A layer of electrochromic material is disposed on the display electrode. A liquid electrolyte material is disposed between the counter electrode and display electrode, the electrolyte material being mildly acidic and having a pH between 2 and 5. The layer of electrochromic material is preferably selected from the group consisting of a diphthalocyanine of a rare-earth element, yttrium and scandium.

10 Claims, 2 Drawing Figures

PHTHALOCYANINE ELECTROCHROMIC DISPLAY WITH IMPROVED CYCLE LIFE

The invention herein described was made in the course of or under a contract or subcontract thereunder with the Department of the Navy.

BACKGROUND OF THE INVENTION

1. Technical Field of the Invention

The invention relates to the field of electrically controllable displays, and more particularly to the field of electrochromic displays.

2. Description of the Prior Art

There are many uses for electrically controllable display devices. A number of such devices have been in commercial use for some time. These display devices include liquid crystal displays, light emitting diode displays, plasma displays and so on. Light emitting diode and plasma display panels both suffer from the fact that they are active, light emissive devices which require substantial power for their operation. In addition, it is difficult to fabricate light emitting diode displays in a manner which renders them easily distinguishable under bright ambient illumination. Liquid crystal displays suffer from the disadvantage that they are operative only over a limited temperature range and have substantially no memory within the liquid crystal material. Further, the visibility of many liquid crystal displays decreases as the viewer moves a few degrees off axis.

Electrochromic displays have been developed which display information through a change in the color of portions in the display via electrochemical reaction of an active material to achieve a color change. Generally with a metal oxide as the active material, this color change is from white to a color such as blue. Because of their coloring mechanism, such displays usually require substantial power and time to write or erase displayed information. The quantities of power required are undesirably large, especially for battery operation. Moreover, the time required to change displayed information makes such materials unacceptable for many display applications. None of these displays display more than a single color against a background. This limits the versatility of such displays since the color of a character cannot be used to convey information.

Rare earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. P. N. Moskalev and I. S. Kirin, "Effect of the Electrode Potential on the Absorption Spectrum of a Rare-Earth Diphthalocyanine Layer," Opt. i Spektrosk, 29, 414 (1970) and P. N. Moskalev and I. S. Kirin, "The Electrochromism of Lanthanide Diphthalocyanines" Russian J. Phys. Chem., 45, 1019 (1972).

U.S. Pat. No. 4,184,751 of M. M. Nicholson describes the use of metal diphthalocyanine complexes as the electrochemically active material in an electrochromic display cell. Rapid color changes in less than 50 milliseconds are achieved, thus alleviating the slow switching time previously reported for rare earth diphthalocyanine complexes. Power requirements are small because of the lower power switching characteristics of the display material and because the display exhibits an open circuit memory of from several minutes to several hours, depending on its construction. A multi-color, i.e., more than one color, display is achieved through use of a range of voltages applied between display and counter electrodes. Color reversal of displayed information and the background against which it is displayed is achieved through use of display electrodes in the background portions of the viewing area as well as in the character segments.

The disadvantage of the metal diphthalocyanine complex electrochromic display is that after repeated use the display electrode deteriorates. Studies have in fact shown that under certain experimental conditions the cycle life may be limited to approximately 50,000 cycles. Prior to the present invention, there has not been a metal diphthalocyanine complex electrochromic display with a long cycle life.

REFERENCES

M. M. Nicholson and R. V. Galiardi, "A Multicolor Electrochromic Display," SID International Symposium Digest, IX, 24 (1978).

M. M. Nicholson and F. A. Pizzarello, "Charge Transport in Oxidation Product of Lutetium Diphthalocyanine," J. Electrochem. Soc., 126, 1490 (1979).

M. M. Nicholson and F. A. Pizzarello, "Galvanostatic Transients in Lutetium Diphthalocyanine Films," J. Electrochem, Soc., 127 821 (1980).

F. A. Pizzarello and M. M. Nicholson, "Solid-State Anion Migration in the Anodic Oxidation of Lutetium Diphthalocyanine," J. Electron, Mat., 9, (1980).

M. M. Nicholson and F. A. Pizzarello, "Cathodic Electrochromism of Lutetium Diphthalocyanine Films," Technical Report No. 3, Contract N00014-77-C-0636, C80-785/201, Nov. 1980.

H. A. Laitinen, C. A. Vincent, and T. M. Bednarski, J. Electrochem. Soc., 155, 1024 (1968).

M. M. Nicholson, R. V. Galiardi, and G. A. Layman, "Investigation of Electrochromic Diphthalocyanines," Final Report, Contracts F49620-77-C-0074 and F49620-79-C-0104, C80-415/501, June 1980.

SUMMARY OF THE INVENTION

Briefly and in general terms, the invention is concerned with an electrochromic display cell in which the electrochromic material is selected from the group consisting of a diphthalocyanine of a rare-earth element, yttrium, and scandium, and the electrolyte is a mildly acidic liquid having a pH between 2 and 5. Such a configuration implements a multi-color electrochromic display with improved cycle life, color contrast and color variety. The configuration also provides lower switching energy for producing light blue and violet colors.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DETAILED DESCRIPTION OF PREFERRED EMBODIMENTS

Figure 1:
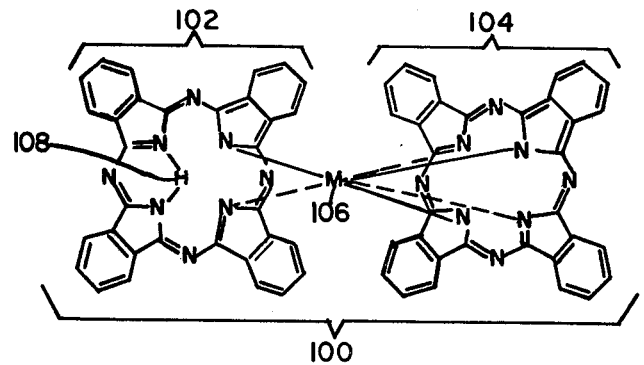
FIG. 1 illustrates the structure of a metal-diphthalocyanine-complex molecule.

The structure of metal diphthalocyanine complexes is illustrated generally at 100 in FIG. 1. This molecule comprises two phthalocyanine ring structures 102 and 104 which are believed to lie in substantially parallel planes with a metal ion 106 (M) disposed between the planes occupied by the phthalocyanine rings. Such a molecule is said to have a sandwich structure. It is recognized that the labile hydrogen atom 108 may not be located at all times in the position shown in FIG. 1. In the preferred embodiment of the invention, the metal in the complex is preferably yttrium, scandium, or a rare-earth of the lanthanide series. However, other metals whose diphthalocyanine complexes are electrochromic may be utilized.

The bonds from each phthalocyanine ring to the rare-earth ion are believed to be what bonds the structure together as a molecule. The detailed internal mechanism which renders a metal diphthalocyanine complex electrochromic is not yet understood, although the existence of the effect is well established. Metal diphthalocyanine complexes for utilization in this invention may be synthesized by methods which have been described in the literature. It is preferred to deposit the metal diphthalocyanine complexes by vacuum sublimation in order to obtain uniform high purity films of the diphthalocyanine complexes in display cells. The diphthalocyanine film of a display cell is preferably deposited by vacuum sublimation of a diphthalocyanine at pressures on the order of $10^{-6}$ mm to $10^{-5}$ mm of mercury.

Further information on metal diphthalocyanine electrochromic display devices is described in U.S. Pat. No. 4,184,751, incorporated herein by reference. As noted above, such devices have a limited cycle lifetime.

Some of the more attractive colors and color combinations in prior art phthalocyanine displays (such as described in M. M. Nicholson, "Phthalocyanine Electrochromic Display", U.S. Pat. No. 4,184,751, Jan. 22, 1980) have been obtained under conditions that contribute to deterioration of the display electrode. Consequently, the cycle life has been limited in some experiments to approximately 50,000 cycles. The present invention provides that greater cycle life can be attained by controlling the pH of the electrolyte at a mildly acidic level and reducing the magnitude of the negative driving voltage. These measures according to the present invention also result in enhanced color contrast and in longer color retention for the red mode.

Figure 2:
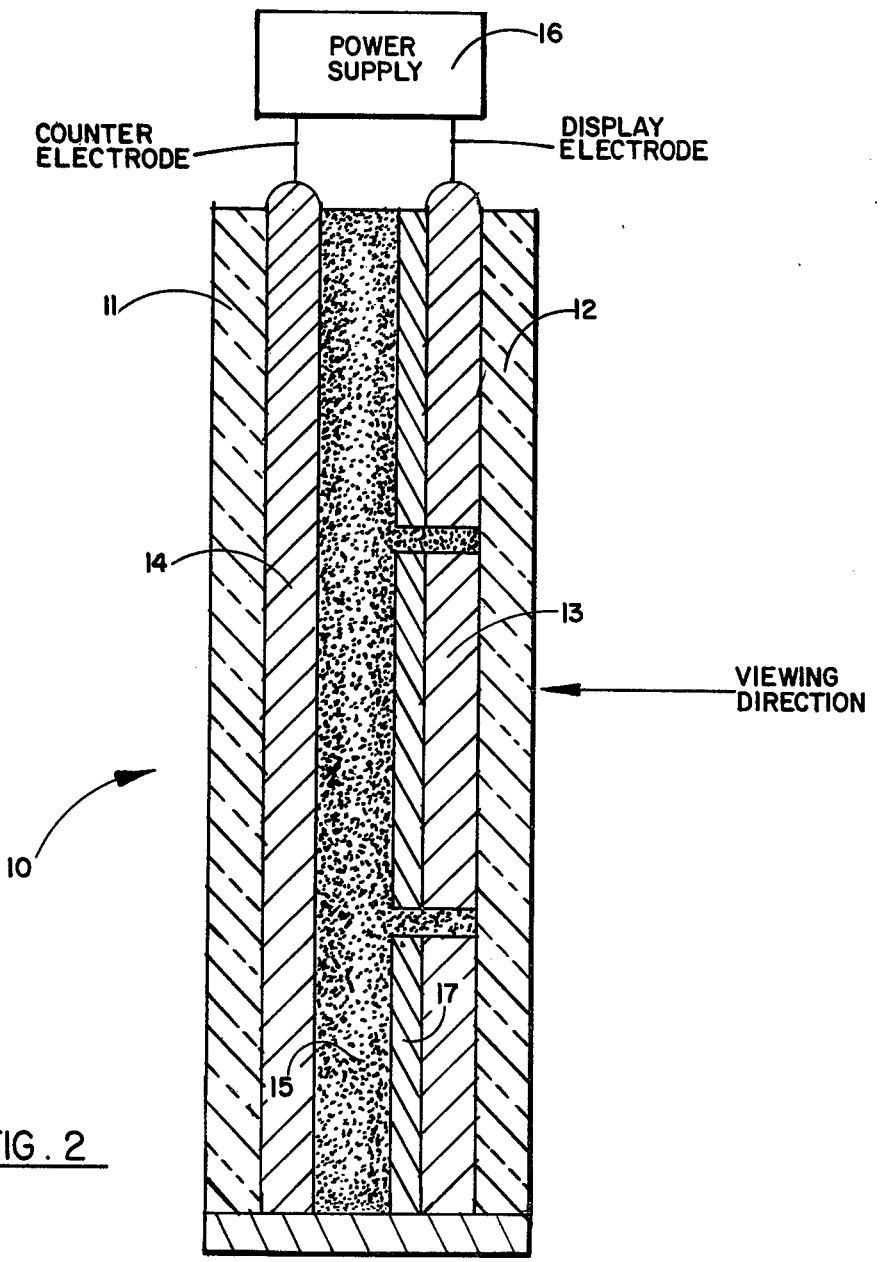
FIG. 2 is an illustration of a cross-section through a typical configuration of a display cell in accordance with the invention.

A display cell using a rare-earth diphthalocyanine electrochromic material is illustrated in FIG. 2. The figure shows a cross-section through a typical configuration of a display cell according to the present invention. The configuration includes a pair 11, 12 of enclosure plates, at least one of which is transparent. The enclosure plates essentially form a container in which the electrolyte may be held. Also provided is a display electrolyte 13 and a counter-electrode 14 which are disposed between the enclosure plates. The electrolyte material 15 is provided between the electrodes and within the pair of enclosure plates. The display electrode 13 and counter-electrode 14 are connected to a source of potential or power supply 16 shown in highly diagrammatic form in the figure. A layer of electrochromic material 17 is disposed on the display electrode 13 according to techniques known in the art. In the present invention the layer of electrochromic material is selected from the group consisting of a diphthalocyanine of a rare-earth element, yttrium, and scandium.

The electrolyte material of the prior art is usually a neutral salt solution such as aqueous potassium chloride. Lutetium diphthalocyanine [LuH(Pc)$_2$] is an example of the electrochromic material. This dye film is initially green. By application of selected cathodic (negative) voltages on the Ag/AgCl scale, its color is changed through shades of blue-green to blue and violet. Under anodic (positive) voltages, it can become yellow, orange, and finally red (see for example, M. M. Nicholson, U.S. Pat. No. 4,184,751 or M. M. Nicholson and R. V. Galiardi, "A Multicolor Electrochromic Display," SID International Symposium Digest, IX, 24, (1978).

The experimental results indicate that prominent violet, dark blue, light blue, green, and red colors correspond to discrete chemical states of the dye, which are produced by electrochemical reactions. See for example, M. M. Nicholson and F. A. Pizzarello, "Charge Transport in Oxidation Product of Lutetium Diphthalocyanine," J. Electrochem. Soc., 126, 1490 (1979); M. M. Nicholson and F. A. Pizzarello, "Galvanostatic Transients in Lutetium Diphthalocyanine Films," J. Electrochem. Soc., 127, 821 (1980); F. A. Pizzarello and M. M. Nicholson, "Solid-State Anion Migration in the Anodic Oxidation of Lutetium Diphthalocyanine, J. Electron. Mat., 9, 231 (1980). The gain or loss of electrons is compensated by migration of ions from the electrolyte into the solid dye material. The color change is reversed when a voltage of opposite sign is applied.

Examples of the electrochromic reactions responsible for the color change are:

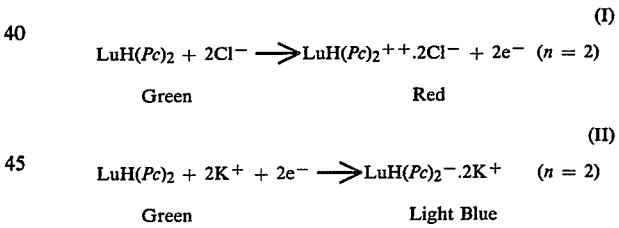

Some dependencies of color on the nature of the participating anion or cation are already known. Accordingly, variation of the electrolyte ions and particularly the cations, is suggested as a means of controlling the colors and color transformation rates. The present invention indicates cations that produce bright blue, dark blue, and violet colors in lutetium diphthalocyanine. Moreover, it is noted that formation of dark blue and violet in a neutral salt solution can lead to deterioration of the dye film, or to fading of the red color produced subsequently. The present invention specifies other electrolytes and operating conditions under which intense colors should be attainable without deterioration or fading. These modifications of the display result in longer cycle life, improved color contrast, and longer open-circuit memory, as well as lower switching energy.

Reaction II noted above produces a light blue color that is useful in displays but less vivid than the dark blue or violet. These deeper colors can be produced by injection of hydrogen ions rather than metal ions such as $K^+$ and $Li^+$.

The dark blue and violet forms cannot yet be distinguished on the basis of the faradaic n values (the numbers of electrons transferred). We estimate that n is 2 or 3 for the dark blue state and 3 or 4 for the violet.

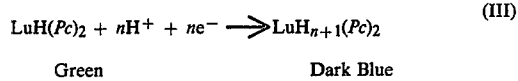

$$LuH(Pc)_2 + nH^+ + ne^- \longrightarrow LuH_{n+1}(Pc)_2 \qquad \text{(III)}$$

Green → Dark Blue

Reaction III noted above occurs easily in an acidic solution, but it is more difficult in the usual display electrolyte such as KCl because the concentration of hydrogen ions is very low ($\sim 10^{-7}$ molar). The darker coloration in KCl appears to result, instead from a two-step mechanism:

$$H_2O + e^- \rightarrow H(Ads) + OH^- \qquad \text{(IV)}$$

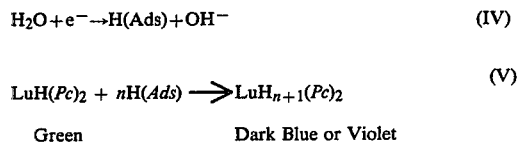

$$LuH(Pc)_2 + nH(Ads) \longrightarrow LuH_{n+1}(Pc)_2 \qquad \text{(V)}$$

Green → Dark Blue or Violet

The reactive intermediate is represented as an adsorbed hydrogen atom H(Ads) because a species with such characteristics is known to form on tin oxide at cathodic potentials, see for example, H. A. Laitinen, C. A. Vincent, and T. M. Bednarski, J. Electrochem. Soc., 115, 1024 (1968). Furthermore, a pH increase accompanies cathodic formation of a blue product from lutetium diphthalocyanine on tin oxide in aqueous KCl, and hydrogen ions are released to the solution on its anodic oxidation.

Although the atomic hydrogen species may react with the dye to produce the desired dark blue and violet colors, it also can have two adverse effects on the display. First, it can result in formation of a gaseous hydrogen film between the tin oxide and the dye, as from the reaction:

$$2H(Ads) \rightarrow H_2(gas) \qquad \text{(VI)}$$

This intervening film can cause the dye to peel away from the substrate. Second, the storage of excess H(Ads) can diminish the permanence of the red color formed at anodic voltages. This may occur if adsorbed hydrogen is released gradually after the display is switched to red. The active H species converts the dye chemically to green or blue forms. Consequently, the display is found to have diminished contrast and shorter memory in the red mode.

In the present invention, the essentially neutral display electrolyte is replaced with a mildly acidic solution. It is usually but not necessarily an aqueous solution. It is estimated that the hydrogen ion activity, with a tin oxide substrate and an aqueous electrolyte, should fall between $10^{-5}$ and $10^{-2}$ molar (pH 5 to 2). The hydrogen ion concentration should not be high enough to attack the tin oxide or any other component of the cell, but it should be sufficient to ensure the occurrence of Reaction III.

Generally, the desired pH can be provided by a buffer solution consisting of a mixture of a weak acid and one of its salts. For example, an acetic acid-sodium acetate mixture can be used at pH 5. A mixture of phthalic acid and potassium acid phthalate will produce a pH of 3. Many other easily prepared buffer solutions are known in the chemical literature. If desired, a dilute acid such as $10^{-2}$ molar HCl can be used without an added salt, but the pH will be more difficult to control in this case than in a buffer mixture. Some ions in addition to those of the buffer system may be needed to optimize the electrolyte composition for various applications. If the buffer has a large anion such as phthalate, for example, it will be necessary to provide an additional, smaller anion such as chloride in order to switch the display to red. This could be done by adding potassium chloride to the pH 3 buffer.

The following are further examples of buffer solutions which range between a pH of 2 and a pH of 5. These buffer solutions are known as Clark and Lubs buffer mixtures which are described in Lange's Handbook of Chemistry, 10th Edition, McGraw-Hill (1961):

| Composition | pH |
|---|---|
| 5.3 ml 0.2 N HCl + 25 ml 0.2 N KCl diluted to 100 ml | 2.0 |
| 3.35 ml 0.2 N HCl + 25 ml 0.2 N KCl diluted to 100 ml | 2.2 |
| 46.70 ml 0.1 N HCl + 50 ml 0.1 M $KHC_8H_4O_4$ diluted to 100 ml | 2.2 |
| 39.60 ml 0.1 N HCl + 50 ml 0.1 M $KHC_8H_4O_4$ diluted to 100 ml | 2.4 |
| 32.95 ml 0.1 N HCl + 50 ml 0.1 M $KHC_8H_4O_4$ diluted to 100 ml | 2.6 |
| 26.42 ml 0.1 N HCl + 50 ml 0.1 M $KHC_8H_4O_4$ diluted to 100 ml | 2.8 |
| 20.32 ml 0.1 N HCl + 50 ml 0.1 M $KHC_8H_4O_4$ diluted to 100 ml | 3.0 |
| 14.70 ml 0.1 N HCl + 50 ml 0.1 M $KHC_8H_4O_4$ diluted to 100 ml | 3.2 |
| 9.90 ml 0.1 N HCl + 50 ml 0.1 M $KHC_8H_4O_4$ diluted to 100 ml | 3.4 |
| 5.97 ml 0.1 N HCl + 50 ml 0.1 M $KHC_8H_4O_4$ diluted to 100 ml | 3.6 |
| 2.63 ml 0.1 N HCl + 50 ml 0.1 M $KHC_8H_4O_4$ diluted to 100 ml | 3.8 |
| 0.40 ml 0.1 N NaOH + 50 ml 0.1 M $KHC_8H_4O_4$ diluted to 100 ml | 4.0 |
| 3.70 ml 0.1 N NaOH + 50 ml 0.1 M $KHC_8H_4O_4$ diluted to 100 ml | 4.2 |
| 7.50 ml 0.1 N NaOH + 50 ml 0.1 M $KHC_8H_4O_4$ diluted to 100 ml | 4.4 |
| 12.15 ml 0.1 N NaOH + 50 ml 0.1 M $KHC_8H_4O_4$ diluted to 100 ml | 4.6 |
| 17.70 ml 0.1 N NaOH + 50 ml 0.1 M $KHC_8H_4O_4$ diluted to 100 ml | 4.8 |
| 23.85 ml 0.1 N NaOH + 50 ml 0.1 M $KHC_8H_4O_4$ diluted to 100 ml | 5.0 |

Another group of buffer solutions with a pH between 2 and 5 are the following:

1. Potassium Hydrogen Tartrate (Saturated at 25° C. pH 3.56 at 25° C.);
2. Potassium Dihydrogen Citrate (0.05 m, pH 3.776 at 25° C.);
3. Potassium Hydrogen Phthalate (0.05 m., pH 4.01 at 25° C.).

These are the National Bureau of Standards buffers.

In addition to the above, other buffer solutions may be used.

It should also be noted that the pH of a solution varies with temperature and that buffer solutions outside of the range of 2 to 5 pH may be utilized depending upon the temperature.

An electrochromic display usually is driven by a voltage pulse. The cathodic driving voltage should be negative enough to bring about Reaction III but not negative enough to cause Reaction IV or Reaction VII.

$$2H^+ + 2e \rightarrow H_2 \qquad (VII)$$

All of these processes are favored by a decrease in pH. The experimental data show, however, that the green-to-blue transition in lutetium diphthalocyanine is influenced more by a pH decrease than the hydrogen evolution reaction. Hence, it is possible to carry out Reaction III without interference from Reactions IV, VI, or VII. For example, the potential for the dark blue transition on a dye/tin oxide electrode was shifted from $-1.0$ V vs Ag/AgCl near pH 7 to 0.0 V vs Ag/AgCl at pH 3. This potential shift places the color reaction in a region where hydrogen evolution should not occur. Thermodynamically, at pH 3, molecular hydrogen should form near $-0.4$ V vs Ag/AgCl. On semiconductive tin oxide, it actually should form at a potential still more negative than $-0.4$ V, i.e., still farther away from the green-to-blue switching potential.

The magnitude of the driving pulse is required to be larger than the voltage drop in the display cell to compensate for the external resistance in series with the cell. The chemically effective applied voltage is the total voltage corrected for ohmic drop. If the ohmic resistance is relatively large, the driving pulse magnitude should be reduced toward the end of the switching time, so that the display electrode is not inadvertently driven into a region where an undesired reaction occurs. The effective negative voltage should never be large enough to cause hydrogen evolution.

In summary, the present invention accomplishes the following improvements in multicolor electrochromic displays using rare-earth diphthalocyanines:

(1) Avoidance of side reactions producing elemental hydrogen in the free state or adsorbed on the transparent conductive substrate.
(2) Improved adhesion of the dye film with resulting increase in cycle life.
(3) Use of dark blue and violet colors without damage to display electrode; resulting increase of color contrast and color variety.
(4) Improved retention of bright red color in display areas that have previously been switched to blue; enhanced color and increased memory in red state.
(5) Lower switching energy to produce dark blue and violet colors.

While the invention has been illustrated and described as embodied in a phthalocyanine electrochromic display with improved cycle life, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various application without omitting features that, from the standpoint of prior art, fairly constitutes essential characteristics of the generic or specific aspects of this invention, and therefore, such adaptations should and are intended to be comprehended within the meaning and range of equivalence of the following claims.

What is claimed is:

1. An electrochromic display cell capable of assuming a plurality of visually distinct optical states and having a cycle life in excess of 50,000 cycles comprising:
    a pair of enclosure plates, at least one of which is transparent;
    a counter electrode and a display electrode disposed between said enclosure plates;
    a layer of electrochromic material disposed on said display electrode, said layer of electrochromic material consisting of an electrochromic diphthalocyanine compound; and
    a liquid electrolyte material disposed between said counter electrode and said display electrode, said liquid electrolyte material being specifically selected to be mildly acidic and having a pH between approximately 5 and 2 so as to enable the display cell to function in excess of a 50,000 cycle lifetime, to provide enhanced color contrast, and longer color retention of the red color mode.

2. A display cell as defined in claim 1, wherein said electrochromic diphthalocyanine compound is selected from the group consisting of a diphthalocyanine of a rare-earth element, yttrium, and scandium.

3. A display cell as defined in claim 1, wherein said electrolyte material comprises a mixture of phthalic acid and potassium acid phthalate.

4. A display cell as defined in claim 1, wherein said electrolyte material comprises a mixture of acetic acid and sodium acetate.

5. A display cell as defined in claim 1, wherein said electrolyte material comprises an acidic buffer solution.

6. An electrochromic display cell capable of assuming a plurality of visually distinct optical states and having a cycle life in excess of 50,000 cycles comprising:
    a counter electrode and a display electrode disposed in said cell;
    a layer of electrochromic material disposed on said display electrode, said layer of electrochromic material consisting of an electrochromic diphthalocyanine compound;
    a liquid electrolyte material disposed between said counter electrode and said display electrode, said electrolyte material being mildly acidic and having a pH between approximately 5 and 2 so as to enable the display cell to function in excess of a 50,000 cycle lifetime, to provide enhanced color contrast, and longer color retention of the red color mode.

7. A display cell as defined in claim 6, wherein said electrochromic diphthalocyanine compound is selected from the group consisting of a diphthalocyanine of a rare-earth element, yttrium, and scandium.

8. A display cell as defined in claim 6, wherein said electrolyte material comprises a mixture of phthalic acid and potassium acid phthalate.

9. A display cell as defined in claim 6, wherein said electrolyte material comprises a mixture of acetic acid and sodium acetate.

10. A display cell as defined in claim 6, wherein said electrolyte material comprises an acidic buffer solution.

* * * * *